I. B. KEMPSHALL.
TIRE.
APPLICATION FILED APR. 2, 1910.
957,168.
Patented May 3, 1910.
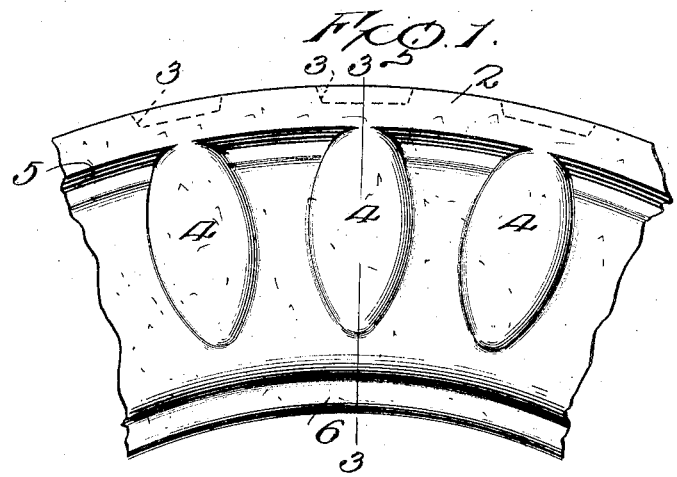
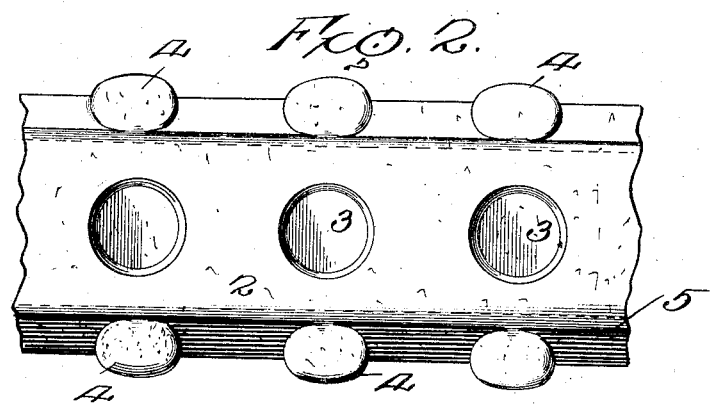
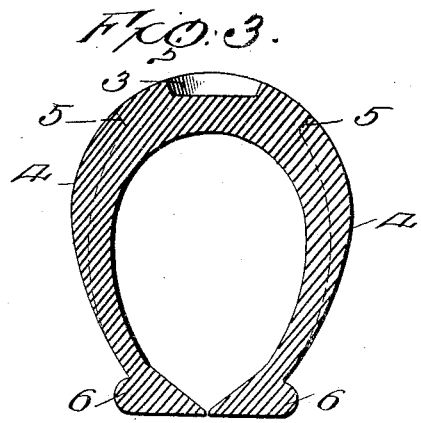
Witnesses
Inventor
Iva Belle Kempshall
By
Attorney

UNITED STATES PATENT OFFICE.

IVA BELLE KEMPSHALL, OF BOSTON, MASSACHUSETTS, ASSIGNOR TO KEMPSHALL TIRE COMPANY, A CORPORATION OF MAINE.

TIRE.

957,168.   Specification of Letters Patent.   Patented May 3, 1910.

Original application filed January 19, 1910, Serial No. 538,853. Divided and this application filed April 2, 1910. Serial No. 553,122.

*To all whom it may concern:*

Be it known that I, IVA BELLE KEMPSHALL, a citizen of the United States, residing at Boston, in the county of Suffolk and State of Massachusetts, have invented certain new and useful Improvements in Tires; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to an improvement in automobile tires, and more particularly to the wear portion or shoe thereof, the object of the invention being to provide an improved tire so constructed as to prevent skidding, and forms a division of my application for patent filed January 19, 1910, Serial No. 538853.

In the drawings accompanying and forming part of this specification, Figure 1, is a side elevation of a portion of this improved tire; Fig. 2 is a view of the tread portion thereof; Fig. 3 is a cross-sectional view taken in line 3—3, of Fig. 1.

Similar characters of reference indicate corresponding parts throughout the figures of the drawings.

In the form shown herein, the shoe when the tire is of pneumatic form, or the wear member thereof when of solid form, may be made of any preferred construction, the surface of which, however, is usually composed of rubber. In the present instance this wear member or shoe 2 is provided along its tread surface or periphery with a series of openings or recesses 3, preferably of circular formation, forming pockets. This series of pockets extends around the whole tread of the tire and forms suction chambers enabling the tire to effectively grip the road surface and prevent skidding. At each side of the tire, entirely around the same, and located in alinement with the pockets is a series of projections 4, shown in the present instance as of substantially oval form, that is, having curved outer and inner ends, with the outer ends of preferably larger curvature than the inner ends. The sides or side edges, however, may be in practice straighter than they are shown in the drawings without departing from the scope of the invention, each of these projections terminating or merging at its outer end in an off-set or projecting flange portion 5 of the tire tread, thus avoiding an abrupt or angular surface at the tread portion of the tire. These projections very materially reinforce the tire at the points of flexure thereof when the same is in use. These projections, being formed in the manner set forth, have their greatest width at the point where the tire bends or flexes when under load, and furthermore, as they merge or terminate below, or short of, the tread surface of the tire they do not form buttresses the ends of which constitute a part of the tread itself, which in practice has proved to be objectionable where there are car tracks and slots in the road bed of traction systems. which it is necessary to frequently cross.

Heretofore, where projections have been located at the side of the tire they terminate in an abrupt surface, the ends forming a portion of the tread, and these buttresses or projections not only tend to become mutilated, but to wrench the tire and wheel when crossing a car track or slots in the roadway of street railway lines. In the present improvement, however, the projections so merge at their outer ends in the tread surface of the tire that there are no abrupt surfaces to be mutilated or catch in tracks or slots of a road-bed.

In operation, the load upon the tire depresses it, thus bringing into action one or the other of the pockets and so prevents the skidding of the tire, while the flexure points of the tire when under load are reinforced by the projections, the tire shoe having the same cross-sectional area throughout, except where the projections are located, at which points the cross-sectional area of the shoe is materially increased and therefore the tire reinforced to prevent injury at the point of flexure when the tire is under load. These projections are also effective to prevent skidding, especially in turning corners.

The present improvement is adapted for use for all classes of resilient tires, whether solid, cushioned, or pneumatic, or otherwise; and when the invention is applied to a shoe the shoe will be provided with the usual means for securing it in place, as a bead or flange 6 for attachment to the rim.

From the foregoing it will be observed that the outer ends of the projections on the tire merge short of the tread thereof in such way that the tread forms with the projections one continuous curve in cross section, (see Fig. 3), thus avoiding the formation of any abrupt surfaces at the termini of the projections adjacent to the tread.

What I claim is:

1. An anti-skidding tire for motor-driven vehicles, having a tread portion provided with a series of chambers or pockets, the tread portion having each side thereof off-set from the side of the tire, and a series of projections located at each side of the tire with their outer ends terminating at the off-set of the tread, a pair of said projections being located in alinement with a pocket.

2. An anti-skidding tire for motor-driven vehicles, having a tread portion convex in cross section, the tread portion having each side thereof off-set from the side of the tire, said off-set portions being wholly within the plane of the outermost surface of the convex tread, and a series of projections located at each side of the tire with their outer ends terminating at the off-set of the tread, a pair of said projections being located in alinement with a pocket.

In testimony whereof I have signed my name to this specification in the presence of two subscribing witnesses.

IVA BELLE KEMPSHALL.

Witnesses:
    JNO. IMIRIE,
    PAUL B. BRACKETT.